United States Patent Office 3,436,417
Patented Apr. 1, 1969

3,436,417
NITRAMINE COMPOUND
Stanley J. Strycker, Midland, Mich., assignor to The Dow Chemical Company, Midland, Mich., a corporation of Delaware
No Drawing. Filed May 31, 1966, Ser. No. 553,694
Int. Cl. C07c *111/00, 125/06;* A01n *5/00*
U.S. Cl. 260—468    4 Claims The present invention is directed to a cycloalkane compound of the formula

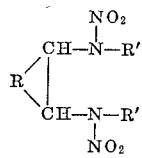

In the above and succeeding formulae, R represents straight-chain alkylene being of from 3 to 6, both inclusive, carbon atoms; and R' represents a member, the same in each occurrence, selected from the group consisting of hydrogen, loweralkoxycarbonyl, alkali metal, and ammonium. In the present specification and claims, the term "loweralkoxy" designates alkoxy radicals being of from 1 to 4, both inclusive, carbon atoms; and the term "alkali metal" is employed to designate appearances of sodium, potassium, and lithium, only.

The products of the present invention are viscous liquids or crystalline solid materials, of varying solubility in organic solvents and in water. Generally, those products wherein R' represents hydrogen or loweralkoxycarbonyl are of moderate solubility in organic solvents and of low solubility in water; and those products wherein R' represents alkali metal or ammonium are of low solubility in organic solvents and of moderate solubility in water. All of the products are prepared in the reaction sequence illustrated by the following equation:

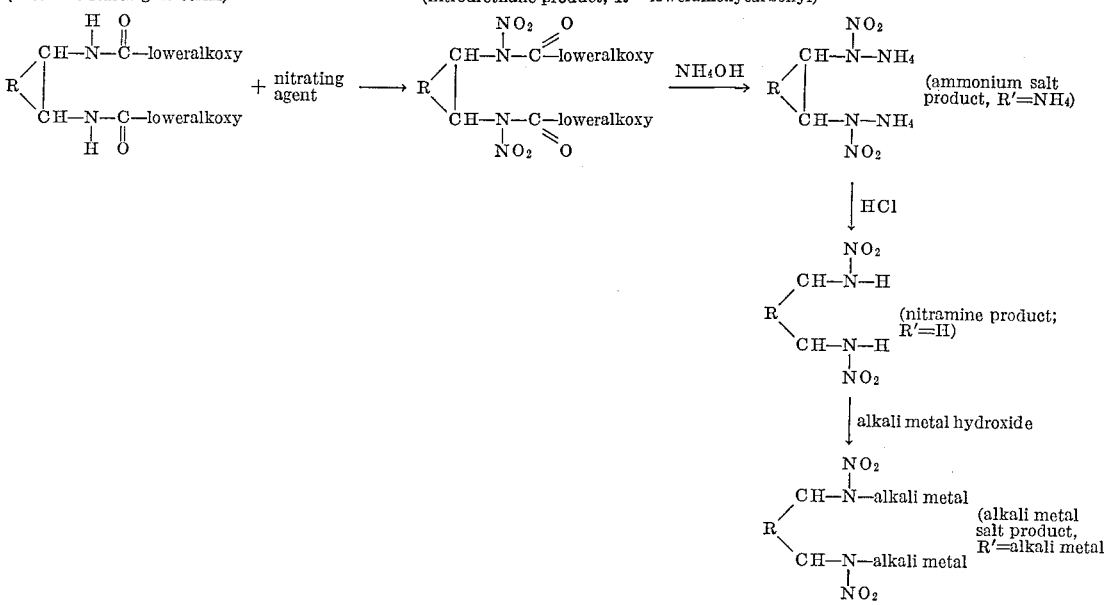

Hence, those products of the present invention wherein R' represents loweralkoxycarbonyl are prepared in an initial reaction; subsequently, these products are reacted further to prepare the remaining products of the present invention.

The starting material for the first reaction, sometimes designated a "urethane," is nitrated by employing any of numerous nitrating agents such as, for example, nitric acid, fuming nitric acid, a mixture of nitric and sulfuric acids, other mixtures having as a major component nitric acid, nitronium tetrafluoroborate (that is, $NO_2BF_4$), and dinitrogen pentoxide. The nitration is carried out in the presence of a liquid reaction medium, such as acetic anhydride, methylene chloride, nitromethane, or, especially where the nitrating agent is nitric acid or fuming nitric acid, an excess of such agent. The preferred method of nitration comprises the use of nitric acid or fuming nitric acid serving both as reactant and as reaction medium, or the use of nitric acid or fuming nitric acid in acetic anhydride. In the latter preferred method, the acetic anhydride serves not only as a reaction medium but also participates in and facilitates the nitration reaction.

The amounts of the urethane starting material and the nitrating agent to be employed are not critical, some of the desired nitrourethane product (that is, the product of the present invention wherein R' represents loweralkoxycarbonyl) being prepared when employing the reactants in any amounts. The reaction consumes the reactants in amounts which represent one molecular proportion of urethane starting material and two molecular proportions of nitrating agent. However, the use of an excess of the nitrating agent gives better results. Accordingly, the reaction is preferably conducted with one molecular proportion of urethane starting material and from 2 to 10, or, yet more preferred, 5 to 10, molecular proportions of nitrating agent.

The nitration reaction takes place smoothly at temperatures between —20 and 25° C. and preferably at temperatures between —5 and 10° C., with the production of the desired nitrourethane product in the reaction mixture. In carrying out the reaction, the reactants are contacted together in any convenient fashion, typically by adding the urethane starting material to the nitrating agent or nitrating agent in inert liquid reaction medium. Some of the desired nitrourethane product is formed immediately upon the contacting of the reactants; however, the yield of the desired product is increased by permitting the reaction mixture to stand for a period of time.

After the completion of the reaction, the nitrourethane product is separated from the reaction mixture in conventional procedures. Typically, the reaction mixture is washed with water to remove excess nitrating agent and inert liquid reaction medium, if employed, is removed by evaporation under subatmospheric pressure. As a result of such operations, the nitrourethane product is obtained as a residue. This product residue can be used without purification or can be purified by conventional procedures, such as, for example, washing with water, washing with inert liquid reaction medium, or recrystallization.

In the second step of the reaction sequence described above, the nitrourethane prepared by the first step is reacted, in accordance with those procedures conventionally used in ammonolysis reactions, to prepare the corresponding product wherein R' represents ammonium. Hence, the reaction can be effected by employing any form of ammonia; typically, however, either ammonium hydroxide or gaseous ammonia is employed. The reaction is conveniently carried out in the presence of an inert liquid reaction medium. Suitable liquids include water, especially when ammonium hydroxide is employed; the lower-alkanols; and ethers, such as diethyl ether, especially where gaseous ammonia is employed.

The amounts of the nitrourethane product and the ammonia reactant to be employed are not critical, some of the desired ammonium salt being obtained when employing the nitrourethane and the ammonia reactant in any amount. The reaction consumes the reactants in amounts which represent one molecular proportion of nitrourethane and two molecular proportions of ammonia reactant. However, the use of the ammonia reactant in excess gives better results. Accordingly, the reaction is preferably conducted with one molecular proportion of nitrourethane and from about 5 to about 15 molecular proportions of the ammonia reactant. The reaction takes place smoothly at temperatures over a wide range, such as at temperatures of from 0 to 100° C.; conveniently, however, the reaction is carried out at temperatures of about 75° to 100° C. The reaction goes forward readily with the production of the desired ammonium salt and of a byproduct of the formula

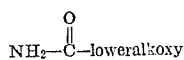

In carrying out the reaction, the reactants are contacted together in any convenient fashion, typically by adding the nitrourethane to an aqueous solution of ammonium hydroxide or by bubbling ammonia gas through a solution comprising the nitrourethane. Some of the desired ammonium salt product is formed immediately upon the contacting of the reactants; however, the yield of the desired ammonium salt is increased by permitting the reaction mixture to stand for a period of time in the reaction temperature range. After the completion of the reaction, the desired ammonium salt product can be separated from the reaction mixture. Preferably, however, the reaction mixture thus obtained, containing the desired ammonium salt, is acidified to prepare the corresponding product wherein R' represents hydrogen, (the nitramine product); this nitramine product can then be reacted with ammonium hydroxide to obtain the ammonium salt product in a form more easily separated from reaction medium. These reactions are discussed below. However, where the ammonium salt product is to be separated directly, such separation is typically carried out by the removal of liquid reaction medium by means of evaporation under subatmospheric pressure. The residue thus obtained comprises the ammonium salt product and the byproduct; these two materials can be separated by employment of a solvent in which the substances have different solubilities. The separated product can be purified by conventional procedures, if desired, or can be employed without purification for the useful purposes of the present invention.

The acidification by which are prepared those products of the present invention wherein R' represents hydrogen is carried out in conventional procedures. In these procedures, the corresponding ammonium salt is dispersed in an aqueous media to which is then added an acid, conveniently hydrochloric acid, in a sufficient amount that the resulting reaction mixture becomes neutral or slightly acidic. Typically, the sufficiency of acid addition is indicated by the precipitation of the product wherein R' represents hydrogen or by the separation of the reaction mixture into aqueous and organic phases. The reaction is conveniently and preferably carried out at room temperature. The desired product wherein R' represents hydrogen is thereafter separated from the reaction mixture in conventional procedures, typically by filtration in the instance of a precipitate, and decantation in the instance where the reaction mixture separates into an aqueous and a product-containing organic phase. The separated product can be purified, such as by recrystallization from water.

Those products of the present invention wherein R' represents alkali metal are prepared from the corresponding products wherein R' is hydrogen. In this preparation, the corresponding nitramine (R'=hydrogen) product is reacted with an aqueous solution of the hydroxide of the desired alkali metal. The reaction consumes the reactants in amounts which represent one molecular proportion of product and two molecular proportions of alkali metal hydroxide; the use of the reactants in amounts representing such proportions is preferred. Room temperatures are employed in carrying out the reaction. Separation, and, if desired, purification, are carried out in conventional procedures. The ammonium salt products (R'=ammonium) can similarly be prepared and separated in this method by employing ammonium hydroxide instead of the alkali metal hydroxide.

The products of the present invention are subject to geometrical isomerism. Mixtures of both cis and trans configurations can be employed for the useful purposes of the present invention. However, the urethane starting material is readily available in either configuration; and, inasmuch as none of the subsequent reactions to prepare the products of the present invention effects the geometrical isomerism, products of the present invention having either configuration are readily prepared.

The following examples illustrate the present invention and will enable those skilled in the art to practice the same.

Example 1.—Diethyl trans-N,N'-dinitro-1,2-cyclohexane-dicarbamate 142 milliliters of 90 percent nitric acid (3.0 moles) were cooled to a temperature of about 0–2° C. Diethyl trans-1,2 - cyclohexanedicarbamate (64.8 grams; 0.25 mole) was added portionwise over a period of 15 minutes and with stirring to the cooled nitric acid. Thereafter, 236 milliliters of acetic anhydride were added portionwise over a period of 1 hour to the reaction mixture. The resulting mixture was held for an additional 5 hours at a temperature of 0–2° C.

Subsequently, the reaction mixture was mixed with 1 liter of ice water and the resulting aqueous layer separated and extracted with three 100-milliliter portions of methylene chloride. The methylene chloride extract and the organic layer were combined and the combined mixture washed with three 500-milliliter portions of water. The washed solution was dried over magnesium sulfate and methylene chloride removed by evaporation under subatmospheric pressure to separate the desired diethyl trans-N,N'-dinitro - 1,2 - cyclohexanedicarbamate product as a liquid residue having a refractive index $n_D^{25}$ of 1.4845.

Example 2.—Trans-N,N'-diammonio-N,N'-dinitro-1,2-cyclohexanediamine

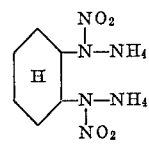

Diethyl trans-N,N'-dinitro-1,2 - cyclohexane-dicarbamate (62.5 grams; 0.179 mole), 73 milliliters of 28 percent ammonium hydroxide (1.07 mole), and 73 milliliters of water were heated on a steam bath, at a temperature of about 85–90° C., for ½ hour, with occasional shaking. As a result of these operations, the expected trans-N,N'-diammonio-N,N'-dinitro-1,2 - cyclohexane-diamine product was prepared in the reaction mixture. The product has a molecular weight of 238.3.

Example 3.—Trans-N,N'-dinitro-1,2-cyclohexanediamine

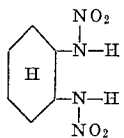

The reaction mixture prepared as described in Example 2 and containing the trans-N,N'-diammonio-N,N'-dinitro-1,2-cyclohexanediamine was permitted to cool to room temperature and the cooled mixture acidified with concentrated hydrochloric acid. The acidification was accompanied by the precipitation in the reaction mixture of the desired trans-N,N'-dinitro-1,2-cyclohexanediamine product. The precipitated product was separated by filtration and the separated product purified by two recrystallizations from water. The product thus obtained melted at 163–163.5° C.

Example 4.—Trans-N,N'-disodio-N,N'-dinitro-1,2-cyclohexanediamine

Trans-N,N'-dinitro-1,2-cyclohexanediamine (20 grams; 0.1 mole) is added portionwise over a period of time to 120 milliliters of a 10 percent sodium hydroxide solution. The addition is carried out at room temperature. Thereafter, the resulting reaction mixture is permitted to stand for a period of time; as a result of these operations, the desired trans - N,N'-disodio-N,N'-dinitro-1,2-cyclohexanediamine product is obtained in the reaction mixture. The product has a molecular weight of 248.2.

In view of the foregoing examples and teachings, those skilled in the art will be enabled to prepare all of the products of the present invention. Representative products include the following:

Cis-N,N'-dinitro - 1,2 - cyclopentanediamine, molecular weight of 190.2;
Dimethyl trans - N,N₂-dinitro-1,2 - cycloheptanedicarbamate, molecular weight of 334.3;
Cis - N,N' - disodio-N,N'-dinitro - 1,2 - cyclooctanediamine, molecular weight of 276.2;
Trans - N,N' - dipotassio-N,N'-dinitro-1,2-cyclohexanediamine, molecular weight of 280.4;
Di - n - butyl trans-N,N'-dinitro-1,2-cyclopentanedicarbamate, molecular weight of 390.4;
Cis - N,N' - dinitro-1,2-cycloheptanediamine, molecular weight of 218.2;
Diisopropyl trans - N,N' - dinitro-1,2-cyclooctanedicarbamate, molecular weight of 404.4;
Trans - N,N' - disodio-N,N-dinitro-1,2-cyclopentanediamine, molecular weight of 234.1;
Cis - N,N' - diammonia-N,N'-dinitro-1,2-cyclooctanediamine, molecular weight of 266.3; and
Trans - N,N' - dilithio - N,N'-dinitro-1,2-cyclohexanediamine, molecular weight of 216.1.

The products of the present invention are useful as agents to modify the growth of plants. At higher rates of application, the products can be employed as herbicides, fungicides, and the like. At lower rates of application, the products can be employed as agents to stimulate the growth of plants. In such operations, the unmodified products can be employed; however, it is generally necessary, for good results, to employ the products in the form of compositions comprising, in addition to the product or products, one or more adjuvants such as surface-active agents, finely-divided solids, organic liquids, water, and the like. In representative operations, an aqueous spray composition comprising cis-N,N'-dinitro-1,2-cyclohexanediamine was applied to plots which had just previously been prepared and seeded with peas and cucumbers. The application was made at a rate of 5 pounds of the compound per acre. Other plots similarly prepared and seeded were left untreated to serve as a control. All plots were held under good agricultural conditions for a period of about two weeks, during which period pea and cucumber seedlings germinated in each of the plots. At the end of the period, the seedlings were measured to determine height above the ground, and the figures averaged for each type of seed in each group. Percent stimulation for each type of seed was determined by the following formula:

$$\text{Percent stimulation} = \left(\frac{T-C}{C}\right) \times 100$$

wherein T=the average height in the treated group and C=the average height in the control group. It was found that the pea plants in the treated group exhibited 15.5 percent stimulation, whereas the cucumber plants exhibited 28.3 percent stimulation.

The urethane compounds to be employed as starting materials in the preparation of the products of the present invention are themselves prepared in known procedures. In these procedures, the Curtius reaction is carried out with an acyl-hydrazide of the following formula:

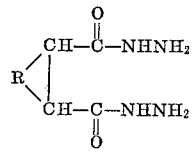

The corresponding isocyanate compound obtained as a result of the reaction:

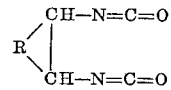

is itself reacted, typically in situ, with a loweralkanol to obtain the desired urethane starting material.

I claim:
1. Compound of the formula

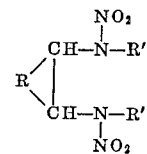

wherein R represents straight-chain alkylene being of from 3 to 6, both inclusive, carbon atoms; and R' represents a member, the same in each occurrence, selected from the group consisting of hydrogen, loweralkoxycarbonyl, alkali metal, and ammonium.

2. The compound of claim 1 wherein R represents tetramethylene.

3. The compound of claim 2 wherein R' represents ethoxycarbonyl.

4. The compound of claim 2 wherein R' represents hydrogen.

References Cited

UNITED STATES PATENTS 2,758,132  8/1956  Thomas _____ 260—482

LORRAINE A. WEINBERGER, *Primary Examiner.*

P. J. KILLOS, *Assistant Examiner.*

U.S. Cl. X.R.

260—563; 71—106, 121